Sept. 11, 1951 A. R. DAVIS Re. 23,409

TRANSFORMER

Original Filed Nov. 24, 1941 4 Sheets-Sheet 1

INVENTOR.
ARIEL R. DAVIS
BY
Frank A. Bower
ATTORNEY

TRANSFORMER

Original Filed Nov. 24, 1941 4 Sheets-Sheet 2

INVENTOR.
ARIEL R. DAVIS
BY
FRANK A. BOWER
ATTORNEY

INVENTOR.
ARIEL R. DAVIS
BY
Frank A. Bower
ATTORNEY

TRANSFORMER

Original Filed Nov. 24, 1941 4 Sheets-Sheet 4

INVENTOR.
ARIEL R. DAVIS
BY
Frank A. Bower
ATTORNEY

Reissued Sept. 11, 1951

Re. 23,409

UNITED STATES PATENT OFFICE 23,409

TRANSFORMER

Ariel R. Davis, Provo, Utah

Original No. 2,361,384, dated October 31, 1944, Serial No. 420,286, November 24, 1941. Application for reissue March 26, 1951, Serial No. 217,662

3 Claims. (Cl. 323—43.5)

Matter enclosed in heavy brackets [ ] appears in the original patent but forms no part of this reissue specification; matter printed in italics indicates the additions made by reissue.

My invention relates to an improved method of controlling lights, or electrical apparatus of any type requiring a variable A. C. voltage on single or multiple circuits.

A further object is to provide a device that can be adjusted to any point within the range of *the* device from above the full line voltage to zero on single or multiple circuits.

A still further object is to provide a new transformer and brush combination which through the use of various simple improvements prevents the usual internal losses and heating of windings due to the short circuiting of adjacent turns by the usual type of brush, making a transformer of high efficiency which will last longer and give greater satisfaction without any of the usual troubles in operation and maintenance.

A still further object is to provide a [dinner] *dimmer* for multiple circuits which is controlled by finger operated sliders so arranged that they may be worked individually or in unison as the time and circumstance require.

The essential feature of the invention is an electrical control device for raising and lowering the voltage through a continuous range without circuit interruption on single or multiple circuits. The principle by which the continuous voltage is maintained is that there are two contactors on each brush insulated from each other and arranged in such a position and mechanically connected together in such a manner that they contact one turn or two adjacent turns of the transformer winding at all times. In other words this is an auto transformer designed for use to control electrical circuits by raising or lowering voltage to any given load such as a motor, bank of lights, electric furnace, and the like.

With this device there is *no* short circuiting between the turns of the main transformer windings when a brush is overlapping any two adjacent turns. When the brush is overlapping two adjacent turns the difference in potential is corrected by connecting one side of the brush with one end of a single turn of wire wound on the core and wound in the same direction as the winding of the particular brush contacts. The other end of this single turn is connected to one lead of the primary winding of an auxiliary transformer. The other end of the primary winding is then connected back to the other side of the brush. In the secondary winding of this auxiliary transformer there is a resistance in series with the winding. It is this combination of devices that prevents any short circuiting in the main winding. For each separate circuit there has to be a separate brush with its own separate turn and auxiliary transformer. It is this improved relationship of devices that makes it possible to use a multiple number of sliders on a single winding and yet have no short circuiting of the winding, for each circuit takes care of its own local exciting current.

The winding of the transformer can be of the auto-transformer type, or with a primary and secondary winding. These windings are made in such a manner that the brush can contact each individual turn used in the voltage regulation by passing over it. Where a primary and secondary winding is used, the secondary winding may be extra heavy, and of few turns where a heavy current is to be regulated with only a small range in the voltage. The auto-transformer type of winding in most cases is the desired type of winding because of simplicity and lower cost of manufacture, etc.

The shape of the core would determine to a great extent the general shape of the windings and the building of *an* efficient transformer.

The three general shapes of cores used for transformers are the core, shell, and toroidal. The core type would be the most useful for my device because a separate winding can be placed on one or more legs thereby increasing the external surface, thus making possible a greater number of sliders for voltage regulation.

Where circular motion is desired, a toroidal coil may be used with a single brush of the aforementioned type on an arm and revolved about the axis of the toroid. The shell type of transformer may be employed in my device where both a primary and secondary winding are used with the brushes, making contact with the secondary.

For easy and effective operation when more than one winding is used for the sliders to contact, it is desirable to have all the sliders at one end of the transformer when they are at full voltage, and the other end when at no voltage. In order to do this the windings are wound with a correct polarity in the manner they will be connected together, which would be in either series or parallel, for single phase currents; and either delta or star, for three phase currents.

It is often desirable to raise the voltage above the line voltage. To do this, extra turns are put on each leg above where the line voltage is applied. The number of extra turns will raise the voltage in direct ratio to the number of turns on the rest of the connected coil.

These objects I accomplish with the device illustrated in the accompanying drawings in which similar numerals and letters of reference indicate like parts throughout the several views and as described in the specification forming a part of this application and pointed out in the appended claims.

In the drawings in which I have shown my device,

Figure 1:
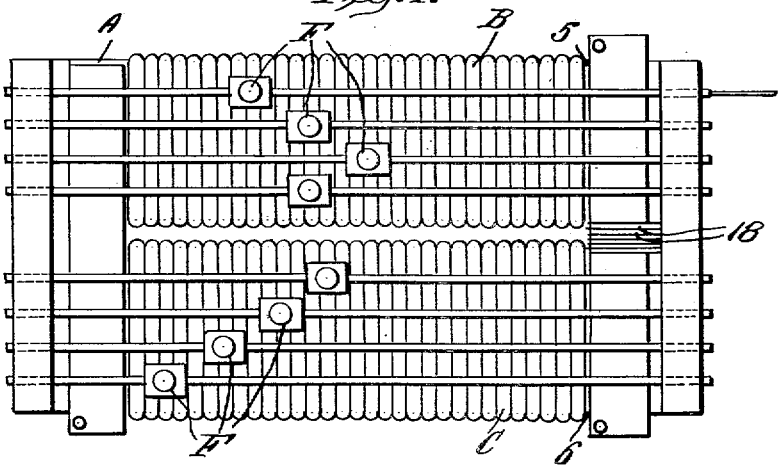
Figure 1 is a plan view of the transformer.
Figure 2:
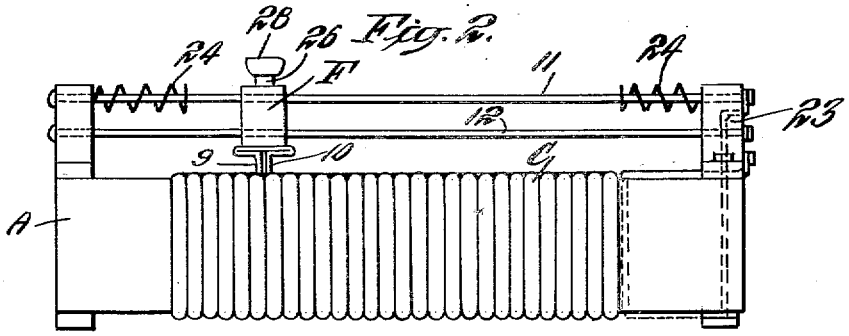
Figure 2 is a side elevation of Figure 1.
Figure 3:
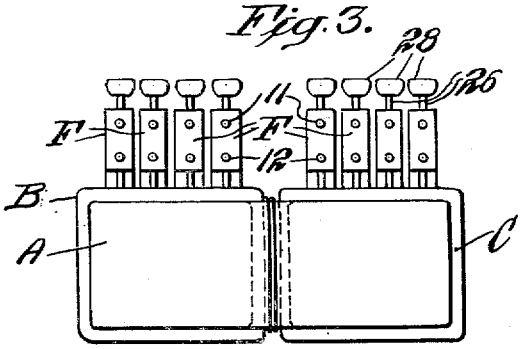
Figure 3 is an end view of Figure 1.

This invention primarily would be used for stage lighting installations to control the various lights on the stage border and other points desired, but is just as important and pertinent to other types of voltage regulating transformers for industrial uses.

The transformer is made of a rectangular core A, having two legs 5 and 6 around which the windings B and C are wound. The windings B and C are continued toward one end of the transformer core beyond the point where the lines 7 and 8 are tapped onto the windings, providing extra windings which are utilized so that brushes do not come to rest on a blank space, but provides extra windings which may be utilized when required to correct line voltage drop by stepping up the voltage above the operating voltage of the line.

The finger control brushes are made of two contact strips 9 and 10 spaced apart by insulation [4] *32*. The two brushes are connected to and longitudinally operated along the slider and current carrying bus bars 11 and 12. One of these bars 11 is connected to the load L, shown as a series of globes 20 and thence through the common ground wire 13 to the alternator [G] *E*.

The transformer is made with an elevated non-conductor block 23 at each end thereof in which the ends of the two bus bars 11 and 12 are supported and carried and springs 24 are mounted on the top bar 11 to limit the endward movement of the brushes so that they will always be on the windings of the transformer and will never pass to far over the ends of the windings of the transformer.

The brushes are all alike, so I will describe but one. Each brush consists of a main body block 25 of non-conducting material, and this block is bored transversely to receive the bus bars 11 and 12 to permit the brush to be moved longitudinally along said bars. The top of each brush is flat and carries a vertical strip 26 secured therein by suitable locking bars 27. On the top end of the strip I provide a finger contact block 28 secured in a like manner to the strip. This thin strip is made to allow a cover to be placed over the entire transformer if desired, and at the same time permit the finger operation of the brushes without any danger of the operator getting a shock through carelessness. Each of the holes through the block 25 is enlarged from one side to receive a contact sleeve 29, which sleeve 29 is to pass contact to the bar from the brushes. This is accomplished by the following means:

The contact brushes 9 and 10 are formed by taking two flat metal strips, such as copper, bending them back upon themselves to form outwardly extended legs 30 and vertical legs 31. The two brushes are spaced apart by an insulating strip [33] *32* and the assembly of two parts of the brush and the insulation strip is set in a vertical slot 34 of block 25. Each leg 30 of the brush is provided with an insulation base 35 to insure that no bending or breaking of the brush will engage the surface of the winding of the transformer and cause a short circuit. The depending ends 36 of *the* brushes [engages] *engage* the surface of the winding B or C. The width of the depending ends 36 [being] *are* such that neither one will be as great as the width of the insulation between the winding of the transformer, and the width of the two *are* so spaced that one will always make contact with a turn of the winding. Tension springs 37 are set in sockets in the block 25 and press down upon the top side of each leg 30 of the brushes to insure an even pressure on the winding of the transformer. A flexible lead 38 is secured to the leg 30 of the brush 10 on one end and the other end connected to the plate 40 on the end of sleeve 29. The leg 30 of the brush 9 is connected to a plate 41 on the end of the other sleeve 29 by the flexible lead 42. The plate 41 is made with a hole 43 therethrough around the bar 12 to insure that there will be not short circuiting of the two slider bars 11 and 12. As shown in Figure 1, there are a multiplicity of these bus bars and an equal number of finger controlled brushes and their relative positions shown in Figure 1 show the positions of any given four of these brushes and illustrates that any position desired for any given circuit may be obtained without [effecting] *affecting* any of the other circuits, each being utilized as an independent dimmer although they all operate on the same transformer.

The auxiliary transformer T is shown as a primary winding 15, a secondary winding 17 and a resistance R connected with the secondary winding. The bar 11 is connected to one end of a single turn winding 18 wound around the end of the core A, in the same direction as the winding which the brush contacts, and thence out to the primary winding 15 of the auxiliary transformer T to the circuit. The auxiliary transformer T is wound with the correct number of turns so that it will limit the current, when the single turn is short circuited, to a small value, but when the full load current is passing through it, the reactance is very small, having no appreciable effect on the load. The value of the resistance R is adjusted to give the minimum loss when the maximum load current is passing through the transformer T, which loss is a very small value. It will be obvious that for each slider or brush and circuit connected thereto there must be a separate single turn 18 and an auxiliary transformer T.

Figure 4:
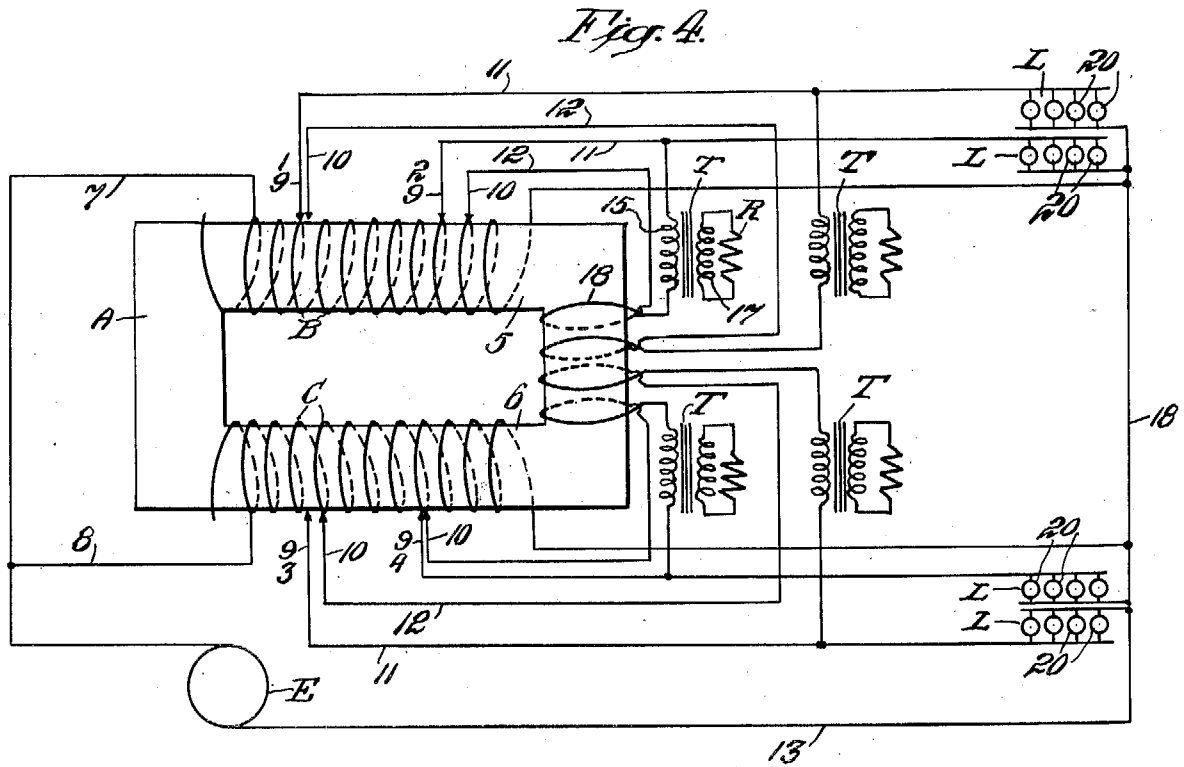
Figure 4 is a diagrammatic view of the wiring system used in the transformer.

In the diagrammatic view shown in Figure 4, I have shown four different individual brushes with four individual loads L, with each brush provided with its individual single turn 18 and the corresponding individual auxiliary transformer T. These brushes are also set to show the cycle of operation of a single brush as it passes through from one turn to the next of the windings, however, to show this more clearly Figures 7, 8, 9 and 10 show the relative positions of a brush as it passes across the length of the transformer windings. In order to get the proper position for the relative advancement of a single brush, these brushes shown in Figure 4 are not shown spaced the same distance apart, as in this type of showing it is necessary to show the contacts in such relative positions as they will make when in actual operation over the surface of the transformer windings.

Figures 7 to 10 inclusively show the relative positions a single brush will have to the windings of the transformer, and these positions are also the positions shown in Figure 4 for the four brushes shown therein.

Figure 7:
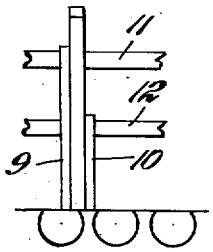
Figure 7 is a diagrammatic showing of the contacts of a brush engaging the windings of the transformer.
Figure 8:
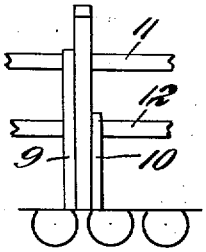
Figure 8 shows the next advanced position of the brush from that shown in Figure 7.
Figure 9:
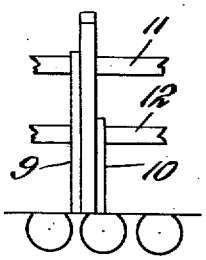
Figure 9 shows the brush in its next relative position.
Figure 10:
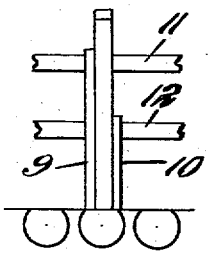
Figure 10 shows the last position of the brush before again entering the position shown in Figure 7.
Figure 11:
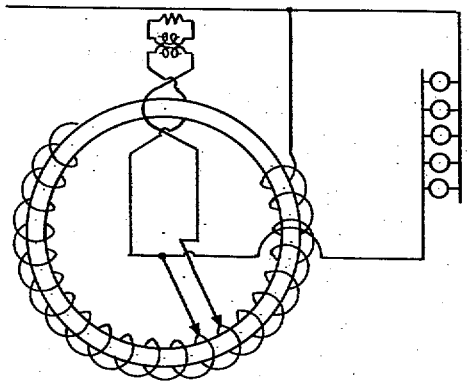
Figure 11 is a diagrammatic showing *of* a modification of the invention modified to show *a* toroidal transformer.

In position 1 shown in Figure 7, the brush is shown with one side or contact 9 engaging one winding of the transformer, while the other side or contact 10 is over an insulated area. In this position the current passes through the brush 9, through the bar 11 to the load L. As the brush advances to the position shown as position 2 of Figure 4 or in Figure 8, the contact 10 engages an advanced winding of the transformer while the contact 9 is still on the first winding, thus two windings are contacted at the same time by the two side contacts 9 and 10. The difference in potential is equalized in this position by the single turn 18, which is wound in the same direction as the winding on which the brush is contacting; the transformer T having no effect upon the circuit. Approximately half of the load or current passing through each side of the brush and out to the load L, shown as the series of globes 20. As the brush advances to its next position 3, shown in Figure 9, the contact 10 is still contacting the same turn of the winding while the contact 9 is now over an insulated area. In this position the contact 10 carries the current through the bar 12 to the single turn 18, through the transformer T, back to the bar 11 and out to the load L. In this position the reactance in the transformer T is very small, so that the current passes readily to the load L. As the brush advances to position 4 of Figure 10, both of the contacts 9, and 10 ride on a single winding of the transformer causing a short circuit in the single turn 18. The current passes through both contacts, the one side going directly to the load, the other through the single turn, the transformer T, and out to the load. The transformer limits the short circuiting current to a small value and dissipates it as heat through the resistance R, utilizing the effect of the auxiliary transformer T and the single turn 18 to the fullest extent, keeping all heating out of the winding of the transformer. This cycle is completed and repeated through each successive movement of the brushes over each successive turn.

*The single turn winding connected between the contactors 9, 10, heretofore termed "contacts," impresses a voltage on the contactors equal and opposite to the voltage of the main winding spanned by the brush when the contactors are each contacting the tap of a separate winding at the same time. In Fig. 1 the contactor 10 engages the tap of the winding having the lower voltage and contactor 9 engages the tap of the winding having the higher voltage. Thus, on spanning windings contactor 9 is at a higher voltage than contactor 10. The contactor 10 is connected to the low voltage end of the single turn winding 18 and contactor 9 is connected to the high voltage end of the single turn winding 18. The winding 18 thus impresses a generated voltage on the brush opposing the voltage difference between the spanned windings and equalizing this voltage difference and eliminating the current that would normally circulate through a shorted winding. The auxiliary current limiting transformer T is preferably connected between the load current carrying bus bar 11 connected to contactor 9 and the high voltage end of the single turn winding 18 so that the load current on passing through the contactor is shunted around the transformer T.*

Figure 5:
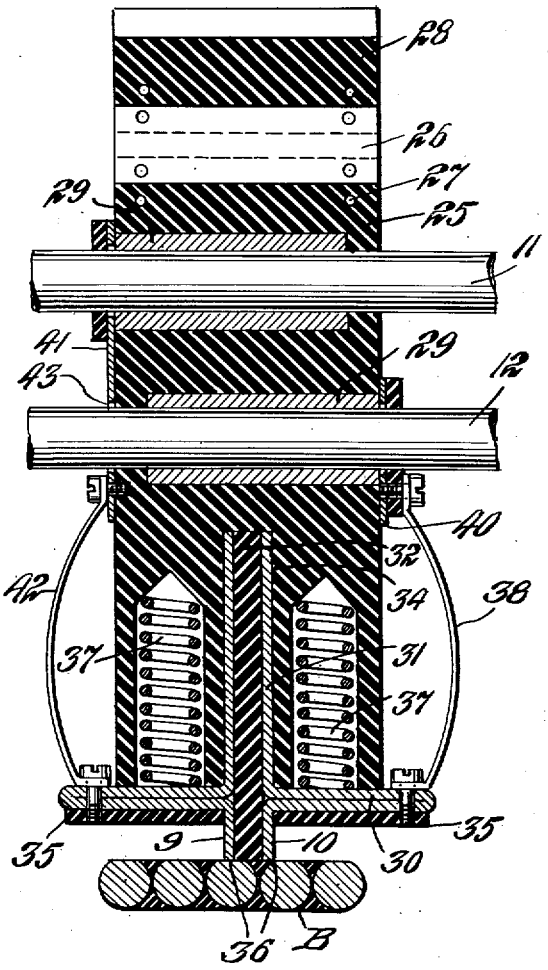
Figure 5 is a section of line 5—5 of Figure 6.
Figure 6:
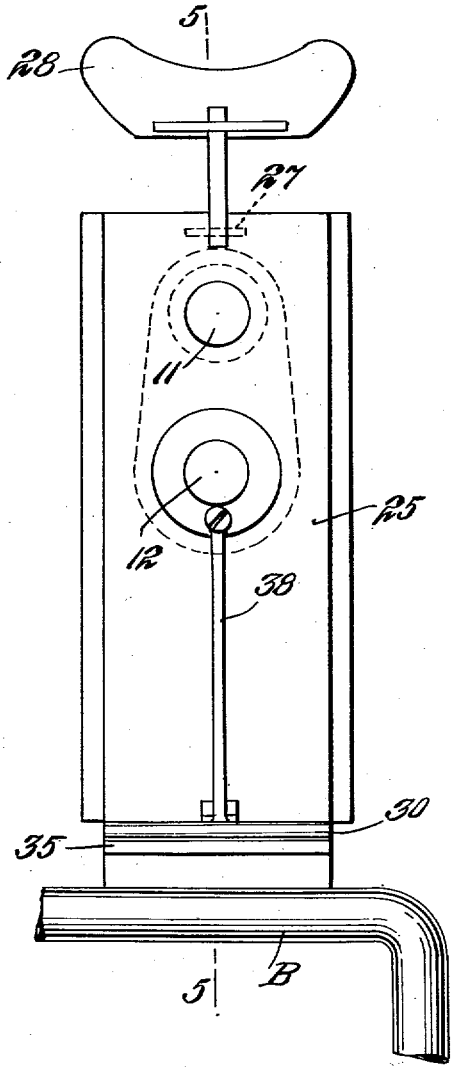
Figure 6 is an enlarged end view of one of the brushes.

A carbon brush or other type of brush having high resistance may be used instead of brush shown in Figures 5 and 6 to limit the current when passing from one winding to the other, eliminating the use of the small transformers and the single turn on a multiple slider installation where the device is only to be used for dimmers for lighting circuits with multiple finger control; but such use causes a heating effect in the windings of the transformer, which is an undesirable feature as is well known in the art.

A choke coil or coils could be used in place of the single turn or transformers, but with a multiple number of sliders, the heating effect in the main winding would become larger and larger when two or more sliders engage the same turn of the winding. This is mentioned so that for some installation, if required by specifications, such an installation may be made without departing from the principle of the multiple brush contacts on a single transformer winding and individual finger control of any circuit.

It will be obvious that various modifications and variations may be made in the structure of the device without departing from the spirit of the invention or the scope of the claims.

The operation of the device is obvious from the above description.

Having thus described my invention, I desire to secure by Letters Patent and claim:

1. A transformer comprising a core; a main winding on said core; a multiplicity of independently operated, individual circuit load control brushes mounted to operate longitudinally along the surface of said main winding, making continuous contact therewith; a multiplicity of single windings each being of the same potential as one complete turn of the main winding, each being connected in series with an auxiliary current limiting transformer and connected to one of the individual control brushes so that the single winding is either in parallel with the turns of the main winding when the brush is covering adjacent turns, that are being traversed, or forms a closed circuit within itself at such times as any brush is completely contacting a single turn of the main winding, said auxiliary transformer limiting the current in the single winding.

*2. A transformer comprising a core, a main winding on said core, a multiplicity of independently operated, individual circuit load control brushes mounted to operate longitudinally along the surface of said main winding, making continuous contact therewith, a multiplicity of single windings each being of the same potential as one complete turn of the main winding and opposing said potential, each being connected in series with an auxiliary current limiting transformer*

*and connected to one of the individual control brushes so that the single winding is either in parallel with the turns of the main winding when the brush is covering adjacent turns and in this position tends to equalize the potential between the turns that are being traversed, or forms a closed circuit within itself at such times as any brush is completely contacting a single turn of the main winding, said auxiliary transformer limiting the current in the single winding.*

*3. A transformer comprising a core, a main winding on said core having a plurality of turns developing a magnetic flux on energization and with taps in predetermined uniform spacing along said winding for the tapping of voltages therefrom, a brush assembly movable along said winding and engaging said taps, said assembly having two contactors spaced apart from each other along the line of movement of said assembly developing a voltage difference between them and having an over-all width and separation to span said taps with one contactor in engagement with one tap and the other contactor in engagement with another tap and also in another position to engage the same tap simultaneously by both contactors, a local circuit connected between said contactors and comprising an auxiliary winding coupled with a magnetic flux creating a voltage between said contactors opposite to the voltage between said taps to tend to equalize the difference in potential between the contactors in said position spanning said contacts and a current limiting means in series with said auxiliary winding in said local circuit acting to limit the short circuit current within said local circuit to a small value when said contactors are in engagement with a single tap, each of said contactors having an individual width less than the separation of said taps so that as one contactor is moved to an intermediate position on one tap the other contactor is positioned in the space between said contacts and the current passes readily through said contacting contactor to the load.*

ARIEL R. DAVIS.

No references cited.